(12) United States Patent
Nakamura

(10) Patent No.: US 7,489,462 B2
(45) Date of Patent: Feb. 10, 2009

(54) MASTER MEDIUM AND MAGNETIC RECORDING MEDIUM

(75) Inventor: Yutaka Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 172 days.

(21) Appl. No.: 11/397,655

(22) Filed: Apr. 4, 2006

(65) Prior Publication Data

US 2007/0146918 A1    Jun. 28, 2007

(30) Foreign Application Priority Data

Dec. 28, 2005    (JP)    ............................. 2005-380038

(51) Int. Cl.
*G11B 5/09*    (2006.01)
*G11B 5/86*    (2006.01)

(52) U.S. Cl. .......................................... 360/48; 360/16

(58) Field of Classification Search .................. None
See application file for complete search history.

(56) References Cited

U.S. PATENT DOCUMENTS

| | | | |
|---|---|---|---|
| 6,324,032 B1 * | 11/2001 | Ohtsuka et al. ............. | 360/131 |
| 6,759,183 B2 | 7/2004 | Nagao et al. ................. | 430/320 |
| 2001/0028964 A1 | 10/2001 | Nagao et al. ................. | 428/694 |
| 2005/0024757 A1 * | 2/2005 | Kubota et al. ................. | 360/17 |

FOREIGN PATENT DOCUMENTS

JP    2001-256644    9/2001

* cited by examiner

*Primary Examiner*—Joseph H Feild
*Assistant Examiner*—Daniell L Negrón
(74) *Attorney, Agent, or Firm*—Greer, Burns & Crain, Ltd.

(57) ABSTRACT

A master medium has a servo pattern to be transferred onto a magnetic recording medium. The servo pattern includes a magnetically stable pattern that is easily transferred onto the magnetic recoding medium and that is magnetically stable.

8 Claims, 9 Drawing Sheets

IS REPLACED WITH

FIG.8
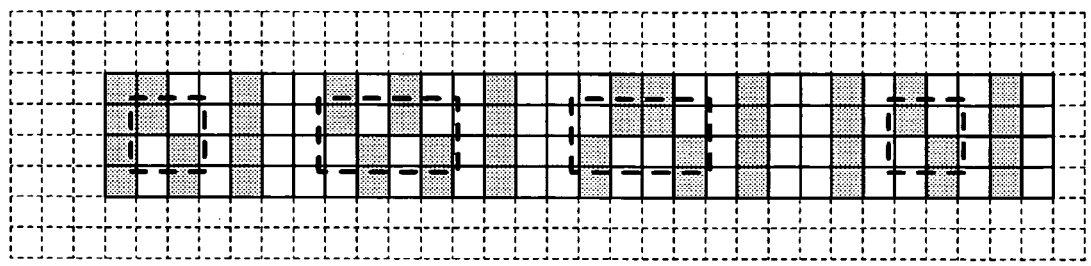
 IS REPLACED WITH
⇩
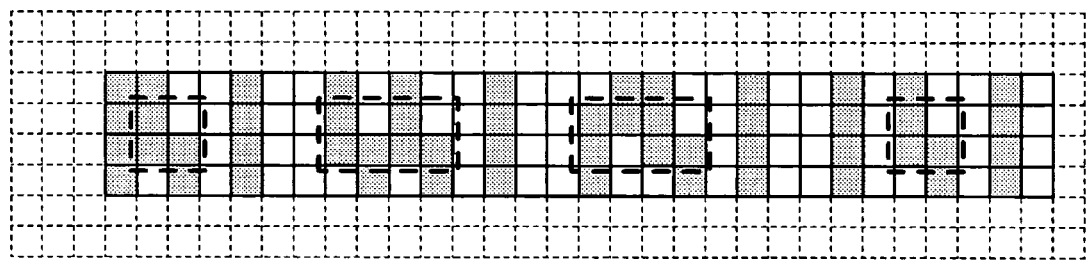
FIG.9
| BIT | SUB-BIT | |
|---|---|---|
| 0 | ☐ | ☐ |
| 1 | ▨ | ☐ |

SUCCESSIVE □□ ARE REPLACED WITH ▨▨

⇩

MASTER MEDIUM AND MAGNETIC RECORDING MEDIUM

BACKGROUND OF THE INVENTION

1. Field of the Invention

The present invention generally relates to a technology for transferring a servo pattern recorded on a master medium onto a magnetic recording medium.

2. Description of the Related Art

A recording density of a magnetic disk device is getting higher for a high capacity year by year, which makes it difficult to produce servo data serving as head positioning data with high precision. However, to reduce a manufacturing cost for a magnetic disk, it is required to easily produce the servo data with high precision.

One approach is to use a master medium and a slave medium. The master medium has servo patterns indicative of servo data formed on its surface. The slave medium is a magnetic recording medium. The slave medium is closely placed on the master medium and a magnetic field is applied to both of them. As a result, the servo patterns can be magnetically transferred from the master medium to the slave medium.

A conventional technique of producing such a master medium is disclosed in Japanese Unexamined Patent Application Publication No. 2001-256644.

According to the conventional technique, when ON/OFF of the servo data are formed with two types of magnetic patterns of opposite magnetic directions, if magnetic patterns having the same direction include contact points for each other, the transferred servo patterns become unstable and easily collapsed.

Besides, when the magnetic patterns having the same direction are arranged in succession, the servo patterns become unstable and easily collapsed, causing a noise around an area where the magnetic patterns are arranged in succession.

In addition, when the servo data is formed with an oblique line pattern in which oblique lines sandwiching a boundary line with a constant angle to the boundary line, because the angle is constant with respect to the boundary line, the oblique line pattern is formed along a circumference of a track as it goes to a circumference of the magnetic disk. As a result, a magnetic component in a cosine direction of an applied magnetic field for transferring the servo data (i.e., a tangential component of a track) is decreased, decreasing an intensity of magnetization. Furthermore, when reading the servo data, it is difficult to read the servo data because magnetic flux components are small in a cosine direction of reading the magnetic information.

SUMMARY OF THE INVENTION

It is an object of the present invention to at least solve the problems in the conventional technology.

A master medium according to one aspect of the present invention has a servo pattern to be transferred onto a magnetic recording medium. The servo pattern includes a magnetically stable pattern that is easily transferred onto the magnetic recoding medium and that is magnetically stable.

A master medium according to another aspect of the present invention has a servo pattern to be transferred onto a magnetic recording medium. The servo pattern is formed with a first bit including a pair of a first sub-bit and a second sub-bit sequentially arranged; and a second bit including a pair of a third sub-bit and a fourth sub-bit sequentially arranged. Each of the first sub-bit, the second sub-bit, the third sub-bit, and the fourth sub-bit is a magnetic unit having a polarity. The first sub-bit and the fourth sub-bit have a first polarity. The second sub-bit and the third sub-bit have a second polarity that is different from the first polarity. When the first bit and the second bit on adjacent tracks of the magnetic recording medium have a neighboring pattern corner in which the first sub-bit and the fourth sub-bit are arranged to make a diagonal contact or the second sub-bit and the third sub-bit are arranged to make a diagonal contact, either one of the first bit and the second bit is replaced with a pair of the first sub-bits sequentially arranged or a pair of the second sub-bits sequentially arranged.

A magnetic recording medium according to still another aspect of the present invention has a servo pattern that is transferred from a master medium. The servo pattern includes a magnetically stable pattern that is easily transferred onto the magnetic recoding medium and that is magnetically stable.

A magnetic recording medium according to still another aspect of the present invention has a servo pattern that is transferred from a master medium. The servo pattern is formed with a first bit including a pair of a first sub-bit and a second sub-bit sequentially arranged; and a second bit including a pair of a third sub-bit and a fourth sub-bit sequentially arranged. Each of the first sub-bit, the second sub-bit, the third sub-bit, and the fourth sub-bit is a magnetic unit having a polarity. The first sub-bit and the fourth sub-bit have a first polarity. The second sub-bit and the third sub-bit have a second polarity that is different from the first polarity. When the first bit and the second bit on adjacent tracks of the magnetic recording medium have a neighboring pattern corner in which the first sub-bit and the fourth sub-bit are arranged to make a diagonal contact or the second sub-bit and the third sub-bit are arranged to make a diagonal contact, either one of the first bit and the second bit is replaced with a pair of the first sub-bits sequentially arranged or a pair of the second sub-bits sequentially arranged.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a schematic for explaining a second example of replacing arrangements of specific sub-bits according to the first embodiment;

FIG. 9 is a schematic for illustrating a relationship between a bit and a sub-bit according to a second embodiment of the present invention;

DETAILED DESCRIPTION OF THE PREFERRED EMBODIMENTS

Exemplary embodiments of the present invention are explained in detail below with reference to the accompanying drawings.

Figure 1:
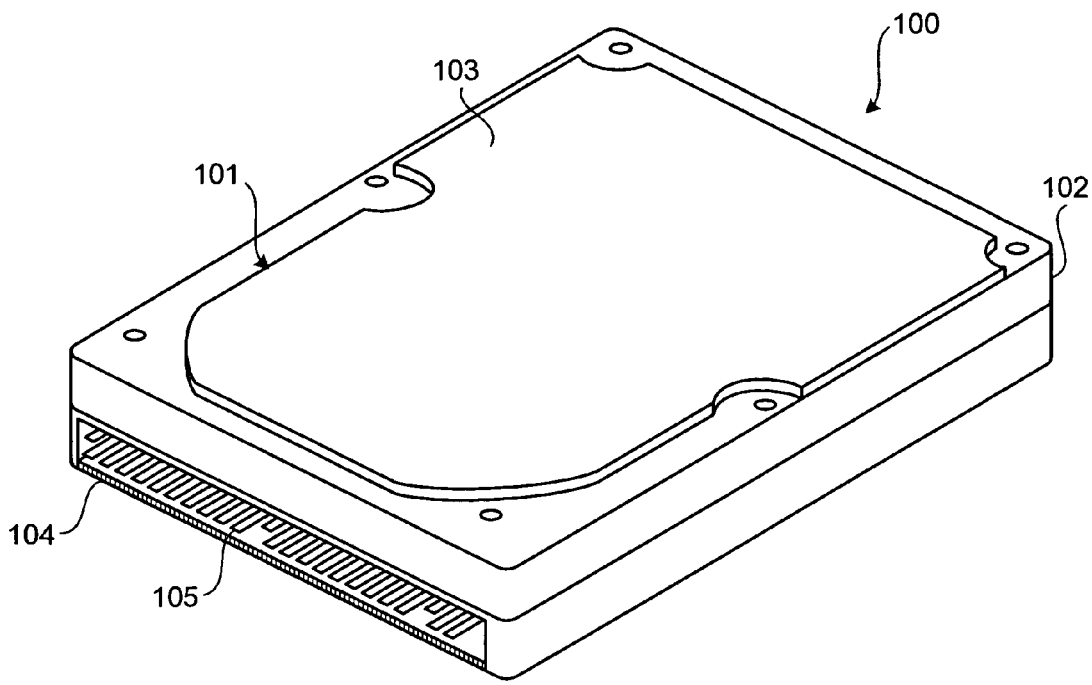
FIG. 1 is a perspective view of an external structure of a magnetic-recording-medium driving unit according to the present invention.

FIG. 1 is a perspective view of an external structure of a magnetic-recording-medium driving unit 100 according to the present invention. The magnetic-recording-medium driving unit 100 includes a box-shaped package 101. The package 101 includes a box-shaped package body 102. The package body 102 includes a setting space (not shown), formed in a rectangular and flat shape, to place a magnetic recording medium. The package body 102 also includes a cover 103. The magnetic recording medium setting space is sealed with the cover 103. The cover 103 is prepared, for example, by pressing a metal plate. The metal plate includes, for example, laminated materials that can absorb vibrations.

A printed board 104 is attached to an exterior of the package body 102. The printed board 104 includes a large scale integration (LSI) chips (not shown), such as a central processing unit (CPU) and a hard disk controller, and a connector 105. The LSI chip controls the magnetic-recording-medium driving unit 100. The connector 105 connects cables (not shown) for conducting controlling signals and for supplying electric power to a main board of a computer system. The computer system (not shown) accommodates the magnetic-recording-medium driving unit 100. The LSI chip operates based on electric power received via the cable.

Figure 2:
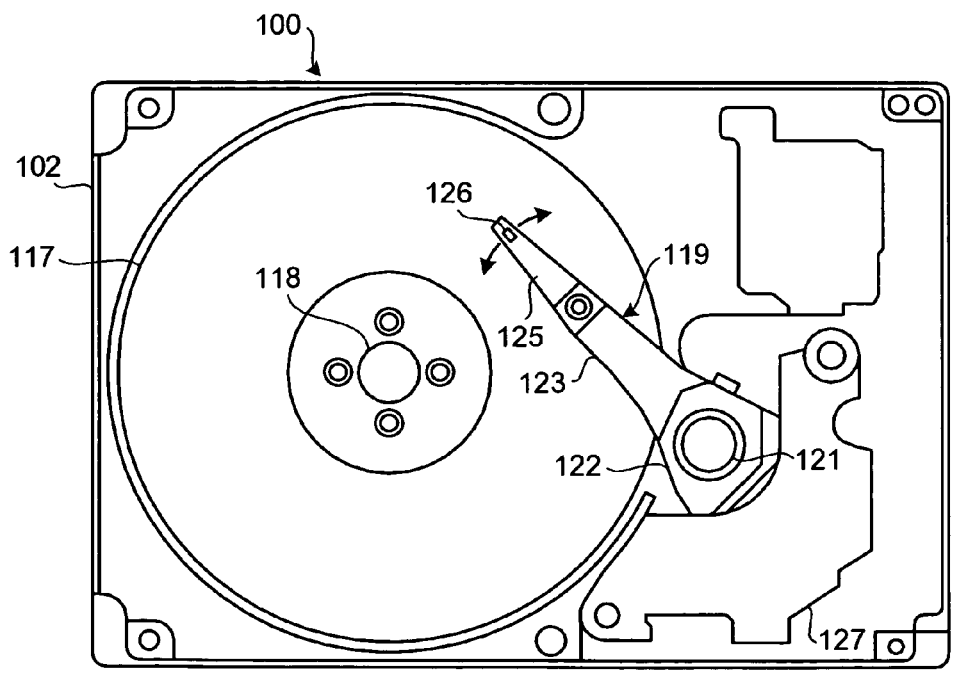
FIG. 2 is a schematic of an internal structure of the magnetic-recording-medium driving unit.

FIG. 2 is a schematic of an internal structure of the magnetic-recording-medium driving unit 100. Internal structure of the magnetic-recording-medium driving unit 100 can be confirmed by removing the cover 103. At least one magnetic disk 117 is placed in the magnetic recording medium setting space. The magnetic disk 117 is used as a recording medium. The magnetic disk 117 is attached to a rotating axis of a spindle motor 118. The spindle motor 118 rotates the magnetic disk 117 at high speed of, for example, 7,200 revolution per minute (rpm) or 10,000 rpm.

A head actuator 119 is placed in the magnetic recording medium setting space. The head actuator 119 includes an actuator block 122. The actuator block 122 is rotatably attached to a spindle 121. The actuator block 122 also includes a rigid and elongated actuator arm 123 attached to the spindle 121. The actuator block 122 is prepared by casting aluminum.

A head suspension 125 is attached to a free end of the actuator arm 123. The head suspension 125 prolongs from the actuator arm 123. A flying head slider 126 is attached to a free end of the head suspension 125. Thus, the flying head slider 126 is eventually connected to the actuator block 122. Furthermore, the flying head slider 126 is placed so that it opposes to the surface of the magnetic disk 117.

A magnetic head (not shown) is on the flying head slider 126. The magnetic head is an electromagnetic conversion element. The electromagnetic conversion element includes a reading element and a writing element. The reading element includes, for example, giant magneto resistive (GMR) element or tunnel junction magnetic resistive (TMR) element. The GMR element and the TMR element are used for retrieving data from the magnetic disk 117 in response to resistance changes of, for example, spindle valve films and tunnel junction films. The writing element includes thin film magnetic head. The thin film magnetic head is used for writing data on the magnetic disk 117 in response to a magnetic field generated based on thin film coil patterns.

The head suspension 125 pushes the flying head slider 126 toward the surface of the magnetic disk 117. As the magnetic disk 117 rotates, airflow is generated around the surface of the magnetic disk 117. Due to the airflow, buoyancy is generated against the flying head slider 126. The pushing force from the head suspension 125 and the buoyancy are balanced so that the flying head slider 126 can continuously and stably floats on the surface of the rotating magnetic disk 117.

A power source 127, such a voice coil motor (VCM), is attached to the actuator block 122. The power source 127 causes the actuator block 122 to rotate on the spindle 121. As the actuator block 122 rotates, the actuator arm 123 and the head suspension 125 oscillate. As the actuator arm 123 oscillates around the spindle 121, the floating flying head slider 126 moves along a radial direction of the magnetic disk 117 on the surface of the magnetic disk 117. When a plurality of the magnetic disks 117 is mounted in the package body 102, two of the actuator arm 123 (two of the head suspension 125) are placed between adjacent magnetic disks 117.

Figure 3:
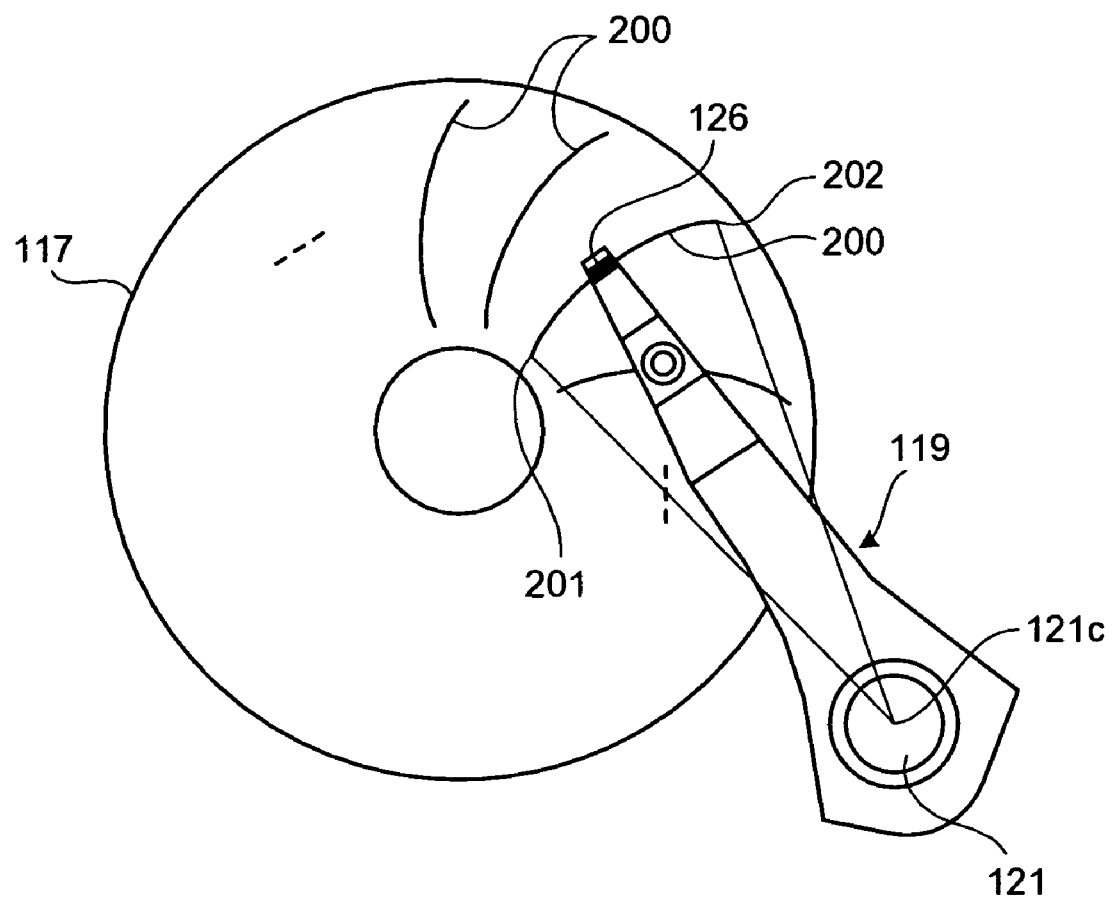
FIG. 3 is a schematic for illustrating servo data on a magnetic disk.

FIG. 3 is a schematic for illustrating servo data 200 on a magnetic disk. The servo data 200 indicates head positioning data. The servo data 200 is patterned on the magnetic disk 117. The servo data 200 is arranged in the form of equally spaced circular arcs from the center to the circumference of the magnetic disk 117 along its radial direction.

One reason for arranging the servo data 200 in the form of equally spaced circular arcs is explained below. The head actuator 119 caracoles in a fan-like form along a central axis 121c. As the head actuator 119 caracoles in the fan-like form, a magnetic head attached to a free end of the head actuator 119 also rotates in the same manner. Thus, only when the servo data is arranged in the form of equally spaced circular arcs, the servo data arranged from a point 201 to a point 202 on the magnetic disk 117 becomes traceable with the magnetic head.

FIG. 4A to FIG. 4D are schematics for explaining a process of magnetically transferring a servo pattern from a master medium to a slave medium.

Figure 4A:
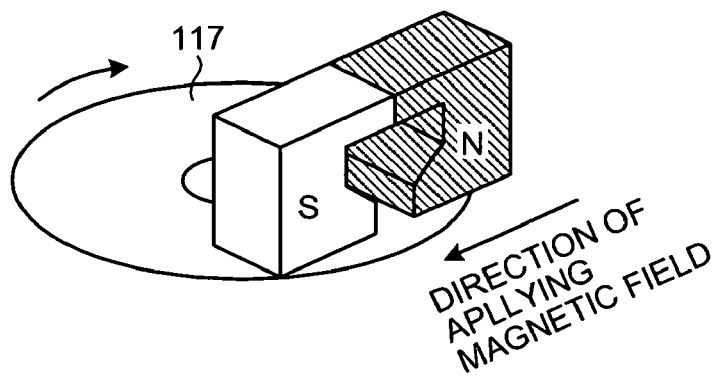
FIG. 4A to FIG. 4D are schematics for explaining a process of magnetically transferring a servo pattern from a master medium to a slave medium.

As shown in FIG. 4A, the magnetic disk 117 is initialized by applying a magnetic field to the magnetic disk 117. A direction for applying the magnetic field is shown in FIG. 4A.

Figure 4B:
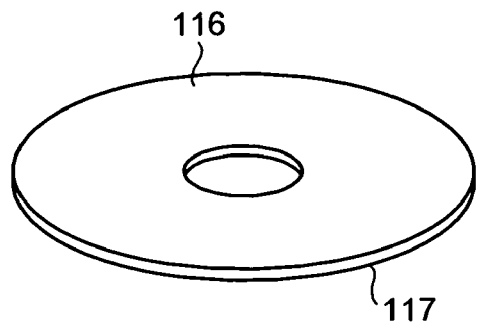

As shown in FIG. 4B, the surface of the magnetic disk 117 is covered with a master medium 116. The magnetic disk 117 is called a slave medium.

Figure 4C:
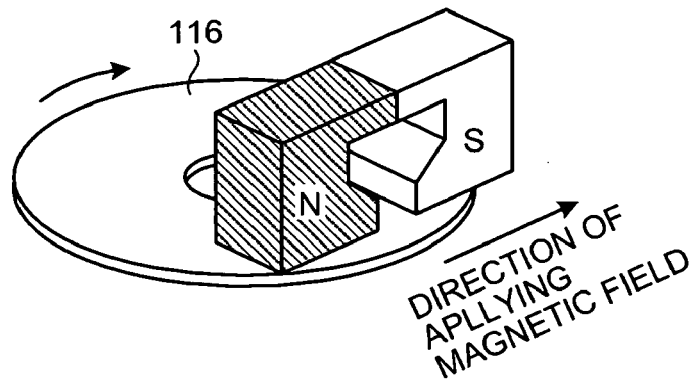
Figure 4D:
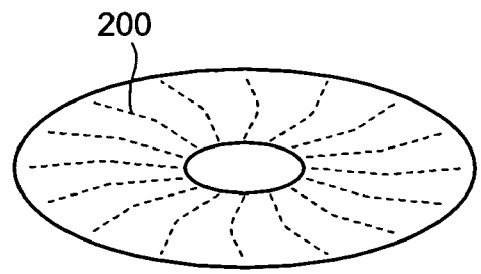

As shown in FIG. 4C, the magnetic field is applied on both of the magnetic disk 117 and the master medium 116. A direction for applying the magnetic field is exactly opposite to that of shown in FIG. 4A. By performing the process shown in FIG. 4A to FIG. 4C, magnetic patterns of the servo data are transferred. As a result, as shown in FIG. 4D, servo zones in which the servo data 200 are recorded are formed.

Figures 5, 6:
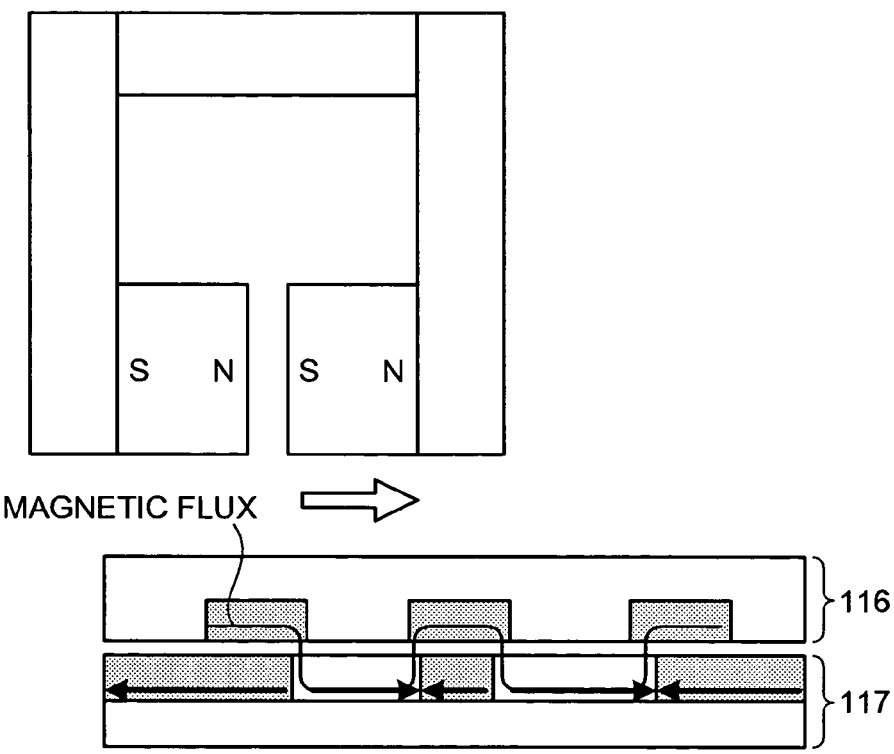
FIG. 5 is a schematic for explaining a process of duplicating a magnetic pattern.
FIG. 6 is a schematic for illustrating a relationship between a bit and a sub-bit according to a first embodiment of the present invention.

FIG. 5 is a schematic for explaining a process of duplicating a magnetic pattern. When the magnetic disk 117 is initialized, the magnetic disk 117 is firstly magnetized to a direction from right to left. Secondary, an external magnetic is applied on both of the master medium 116 and the magnetic disk 117 to a direction from left to right as shown in FIG. 5. As the external magnetic is applied, the master medium 116 is magnetized with magnetic flux. As a result, some magnetic flux on the master medium 116 and some magnetic flux on the magnetic disk 117 are overlaid each other. As some magnetic flux is overlaid, the external magnetic is partially applied on the magnetic disk 117. Namely, magnetic flux, which is overlaid by that of the master medium 116, on the magnetic disk 117 is not affected by the application of the external magnetic. As remaining area of the magnetic disk 117 is not overlaid with the magnetic flux of the master medium 116, it is magnetized in response to the external magnetic to the direction from left to right as shown in FIG. 5. As a result that some magnetic directions are changed, servo patterns including servo zone for recording the servo data 200 are generated.

FIG. 6 is a schematic for illustrating a relationship between a bit and a sub-bit according to a first embodiment of the present invention. Digital data is usually designated with bits, which are indicated with 0 and 1. On the magnetic disk 117, they are designated with predetermined sequences of an open square (hereinafter, "W") and a solid square (hereinafter "B"). W and B are specified according to magnetic directions. W is specified to have a north (N) pole of magnet on the right side and a south (S) pole of magnet on the left side. In case of W, a magnetic line of force is directed from left side to right side and a magnetic field is directed from right side to left side. On the contrary, B is specified to have N pole on the left side and S pole on the right side. In case of B, a magnetic line of force is directed from right side to left side and a magnetic field is directed from left side to right side. W and B are described as sub-bits in the documents. According to the first embodiment, bit-data of 0 is designated as WB and bit-data of 1 is designated as BW as shown in FIG. 6. Bit-data of 0 and 1 are described as data pattern. Sub-bit data of W and B are described as write pattern, which indicates patterns for writing data on the magnetic disk 117. Furthermore, W and B are magnetic units indicating polarities. In some cases, the magnetic units, which have the same sub-bit data, are arranged so that when they have contact points each other, which is caused by dense magnetic units.

Figure 7:
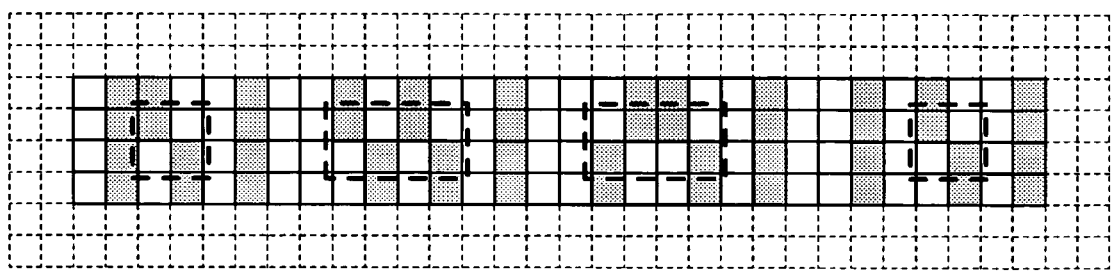
FIG. 7 is a schematic for explaining a first example of replacing arrangements of specific sub-bits according to the first embodiment.
Figure 7:
Figure 7:
Figure 7:
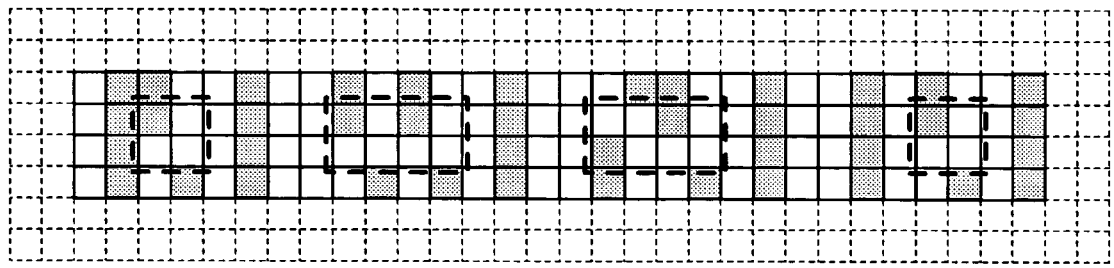

FIG. 7 is a schematic for explaining a first example of replacing arrangements of specific sub-bits according to the first embodiment. In FIG. 7, WB and BW represent 0 and 1, respectively. In area framed with dashed-lines, a plurality of Bs is diagonally arranged. As Bs are diagonally arranged, adjacent Bs make a contact at the corners. The contact points are called "neighboring pattern corners". The diagonal lines are determined with a square having a matrix of two B and two W.

A plurality of Bs has the same magnetic lines of force. Due to the same magnetic lines of force, Bs show transition response so that they contact not at the corners but at the sides. The transition response causes "magnetic collapse", that is, patterns having "neighboring pattern corners" collapse. As a result, accuracy of the magnetic patterns of the transferred servo data becomes unstable.

The first example for ensuring the accuracy of the magnetic patterns is to replace WB with WW, when they are transferred, as shown in a bottom figure of FIG. 7. When the servo data is retrieved, WW are replaced back to WB. As patterns are replaced, Bs are not connected at the corners so that the "magnetic collapse" is reduced.

FIG. 8 is a schematic for explaining a second example of replacing arrangements of specific sub-bits according to the first embodiment. In FIG. 8, WB and BW represent 0 and 1, respectively, and they are arranged in the same manner as shown in FIG. 7.

The second example for ensuring the accuracy of the magnetic patterns is to replace WB to BB, when they are transferred, as shown in a bottom figure of FIG. 8. When the servo data is retrieved, BB are replaced back to WB. Due to the replacements, B are not connected at the corners of the squares to reduce the "magnetic collapse".

An algorithm for replacing WW with WB or for replacing BB with WB are stored and executed, as a control program, in the LSI chip of the printed board 104 in the magnetic-recording-medium driving unit 100.

FIG. 9 is a schematic for illustrating a relationship between a bit and a sub-bit according to a second embodiment of the present invention. According to the second embodiment, bit-data of 0 is designated as WW and bit-data of 1 is designated as BW, as shown in FIG. 9.

Figure 10:
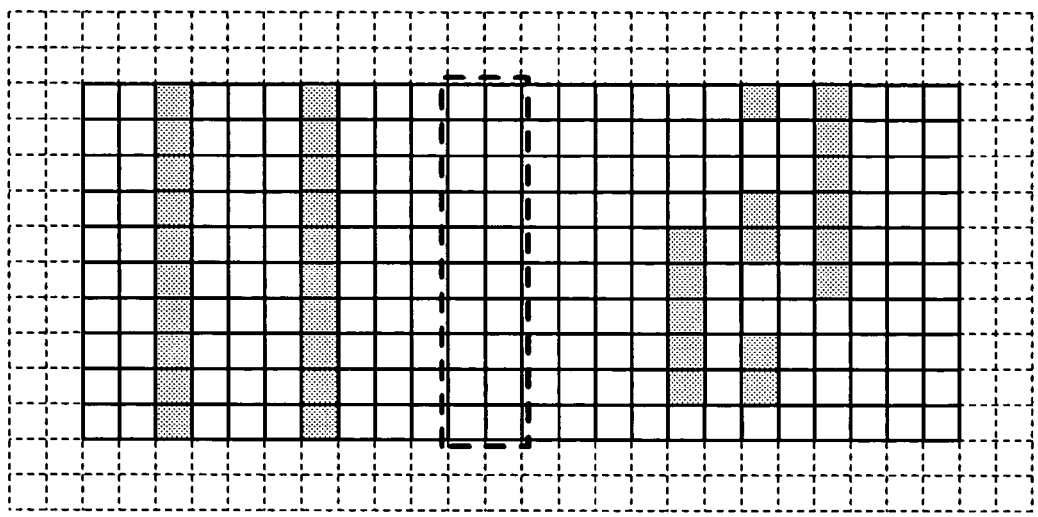
FIG. 10 is a schematic for explaining an example of replacing arrangements of specific sub-bits according to the second embodiment.
Figure 10:
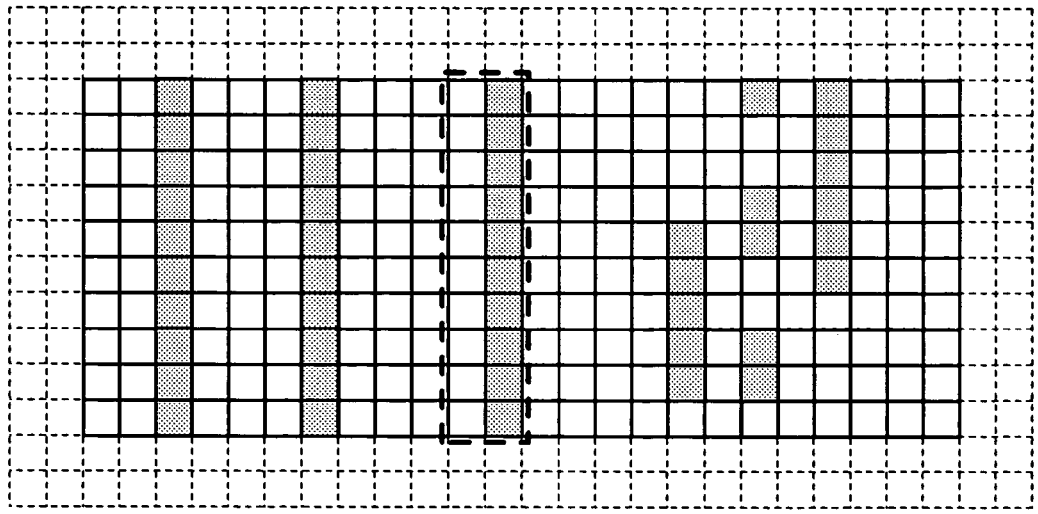

FIG. 10 is a schematic for explaining an example of replacing arrangements of specific sub-bits according to the second embodiment. In FIG. 10, WW and BW represent 0 and 1, respectively. In area framed with dashed-lines, WW are arranged in more than three successive rows. The area having WW arranged in more than three successive rows is described as "wide interval pattern".

As magnetic lines of force are consistently directed from S pole to N pole, successive WW have their poles on the same sides. Consequently, both ends of S pole and N pole become far away when the WW are arranged, for example, in more than three successive rows. As a distance of the S pole and the N pole become longer, strength of the magnetic lines of force become lower. As the strength of the magnetic lines of force become lower, there occurs "magnetic noise". The "magnetic noise" causes to break patterns of servo data, which results in reducing accuracy of the magnetic patterns of the transferred servo data.

One approach for preventing from the "magnetic noise" is to replace at least one WW with WB, when a plurality of WWs is arranged in more than three successive rows, as shown in a bottom figure of FIG. 10. As at least one WW is replaced to WB, the successive rows become separated. When the servo data is retrieved, WB are replaced back to WW. Due to the replacements, the successive rows of WW become separated with WB to reduce the "magnetic noise".

When at least one successive WW pattern is replaced with WB and, at the same time, WB is replaced with either WW or BB, both the "magnetic noise" and the "magnetic collapse" can be reduced.

An algorithm for replacing WW to WB is stored and executed, as a control program, in the LSI chip of the printed board 104 in the magnetic-recording-medium driving unit 100.

Figure 11:
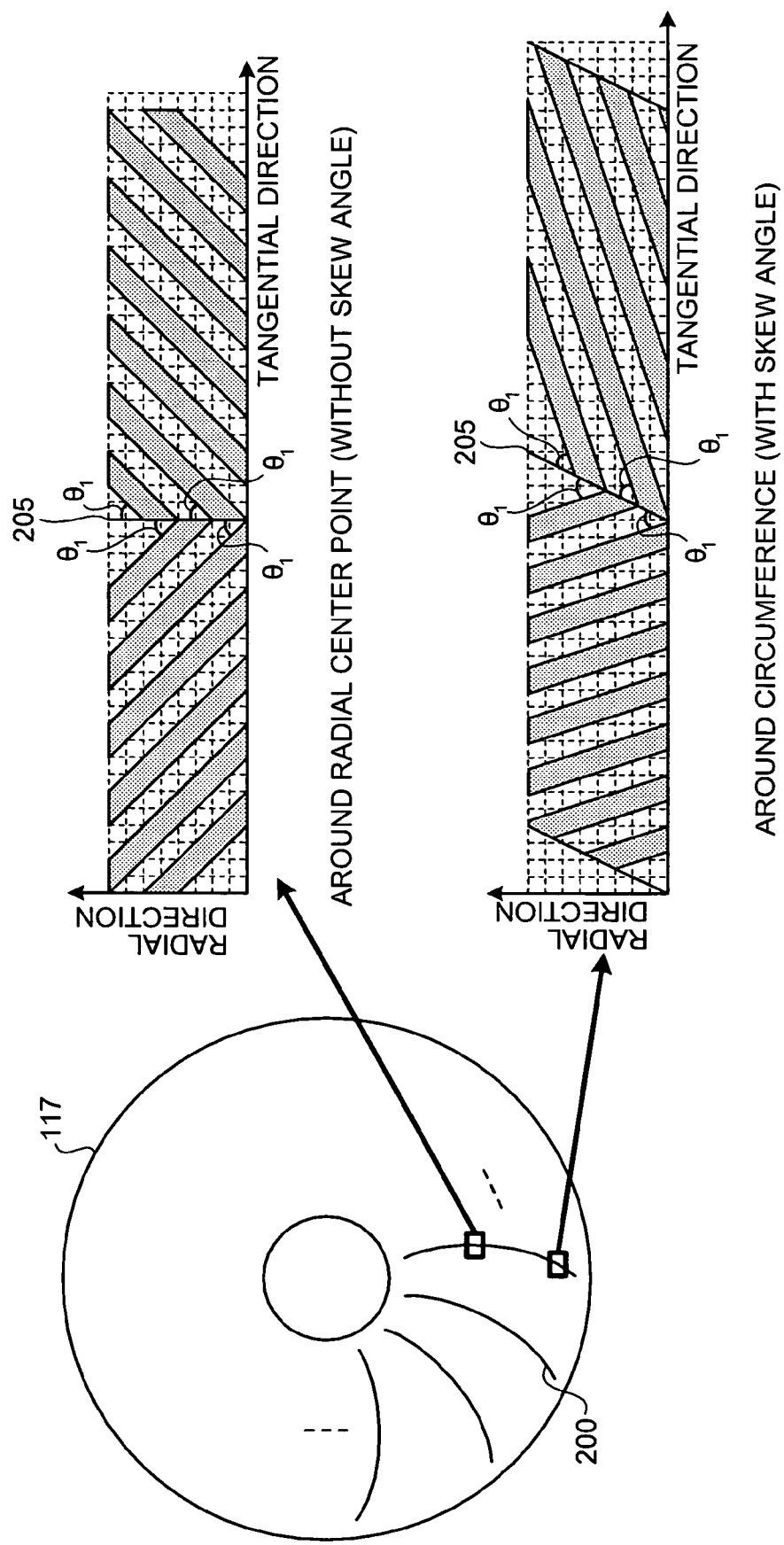
FIG. 11 is a schematic of an oblique line pattern according to a conventional technology.

FIG. 11 is a schematic of an oblique line pattern according to a conventional technology. The oblique line pattern is a servo pattern forming servo data, and is formed with oblique lines oppositely arranged across a boundary line. The oblique line patterns are determined based on phase differences between oblique lines arranged oppositely across the boundary lines. The conventional oblique line patterns have a constant angle to an oblique line pattern boundary line 205.

An enlarged view for explaining a servo pattern of the servo data 200 arranged around the center of the magnetic disk 117 is shown in right top of FIG. 11. The boundary line 205 is arranged parallel to a radius and vertical to a tangent for a track of the magnetic disk 117. All the oblique lines cross to the boundary line 205 and make a constant angle shown as θ1.

An enlarged view for explaining a servo pattern of the servo data 200 arranged around the circumference of the magnetic disk 117 is also shown in right bottom of FIG. 11. The boundary line 205 has a certain angle both to the radius and the tangent. The angle to the radius is called a skew angle. All the oblique lines cross to the boundary line 205 and make the constant angle shown as θ1.

As the conventional oblique lines have the constant angle to the boundary line 205, the oblique lines, around the center and the circumference of the magnetic disk 117, make acute angles to the tangent. As the oblique lines make the acute angles to the tangent, tangential elements, which are generated from the servo patterns, of strength of magnetic flux become smaller. As a result, when the servo patterns are transferred, magnetic strength of the servo patterns become weak around the center and the circumference of the magnetic disk 117. Furthermore, when the servo data is retrieved, tangential elements of strength of magnetic flux become weak. As the tangential elements become weak, there occur problems when the servo data is retrieved. The third embodiment is made to solve the problems with retrieving data.

Figure 12:
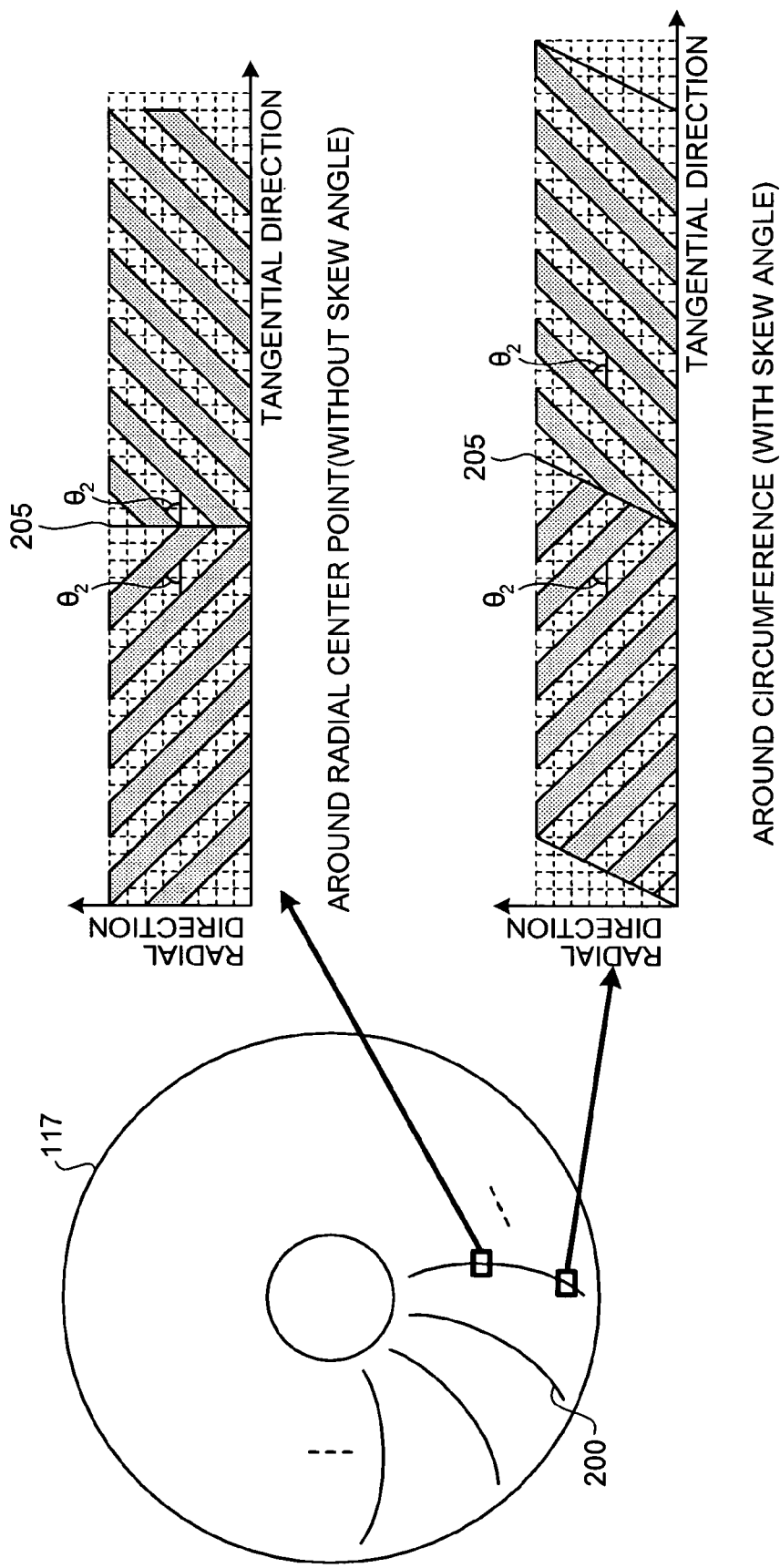
FIG. 12 is a schematic of an oblique line pattern according to a third embodiment of the present invention.

FIG. 12 is a schematic of an oblique line pattern according to a third embodiment of the present invention. The oblique line patterns have a constant angle to the tangent of the magnetic disk 117.

An enlarged view for explaining a servo pattern of the servo data 200 arranged around the center of the magnetic disk 117 is shown in right top of FIG. 12. The boundary line 205 is arranged parallel to the radius and vertical to the tangent for a track of the magnetic disk 117. All the oblique lines make a constant angle to the tangent shown as θ2.

An enlarged view for explaining a servo pattern of the servo data 200 arranged around the circumference of the magnetic disk 117 is also shown in right bottom of FIG. 12. The boundary line 205 has the skew angle to the tangent. All the oblique lines cross to the boundary line 205 and make the constant angle shown as θ2 in FIG. 12.

As the angle between the oblique lines and the tangent is constant, it constantly makes the same angle despite where the oblique lines are arranged on the magnetic disk 117. As the angle between the oblique lines and the tangent is constant, tangential components generated from the servo patterns of strength of magnetic flux become stable. Furthermore, the angle becomes constant despite the skew angle or the radius. As the magnetic strength of the servo patterns becomes stable despite where the servo patterns are on the magnetic disk 117, the servo patterns can be easily copied. Furthermore, when the servo patterns or the servo data are retrieved, tangential elements of strength of magnetic flux become stable. As a result, the servo data become easily retrieved. In the servo pattern of the third embodiment, the oblique lines make the same angle to the boundary line 205 as that of the conventional oblique lines. Furthermore, length of the oblique lines arranged in one track is constant despite the skew angle or the radius. As the length is constant, the servo patterns are used for determining magnetic head positions.

The master medium according to the present invention includes specific servo patterns that are magnetically stable and prevent from causing magnetic collapse, magnetic noise and unstable strength of magnetic flux when the servo patterns are transferred on the magnetic recording medium. More specifically, the servo patterns prevent the magnetic collapse by replacing magnetic units, which contact at the corners, with predetermined alternate patterns. The servo patterns also prevent the magnetic noise by inserting predetermined alternate patterns between magnetic units, which have the same magnetic direction and are arranged in succession. Furthermore, the servo patterns ensure accuracy of reading servo data by retaining the strength of magnetic flux of the magnetic disk 117, when the servo patterns include the oblique line patterns.

According to the present invention, the servo patterns can be magnetically transferred with ease.

Furthermore, according to the present invention, the servo patterns can be magnetically transferred with ease, and a transferred state can be kept constantly.

Moreover, according to the present invention, it is possible to prevent a collapse of transferred servo pattern, to transfer the servo pattern with ease, and to keep the transferred state constantly.

Furthermore, according to the present invention, an intensity of magnetization for transferring the servo data becomes stable and magnetic flux components, which are arranged to a cosine direction, become stable so that the servo data is retrieved clearly.

Moreover, according to the present invention, in intensity of magnetic flux becomes stable so that the servo data is stably and clearly retrieved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A master medium having a servo pattern to be transferred onto a magnetic recording medium, wherein the servo pattern is formed with
   a first bit including a pair of first sub-bits sequentially arranged; and
   a second bit including a pair of a first sub-bit and a second sub-bit sequentially arranged, and
   each of the first sub-bit and the second sub-bit is a magnetic unit having a polarity,
   the first sub-bit and the second sub-bit have different polarities, and
   when the first bit is arranged in succession, at least one of continuous first bits is replaced with the second bit.

2. The master medium according to claim 1, wherein
   when the second bit is arranged with a shift of one sub-bit along a borderline of adjacent tracks of the magnetic recording medium, one of adjacent second bits is replaced with the first bit or a pair of the second sub-bits sequentially arranged.

3. A master medium having a servo pattern to be transferred onto a magnetic recording medium, wherein
   the servo pattern has a plurality of oblique lines oppositely arranged across a boundary line, and
   the plurality of oblique lines include:
      first lines having a first angle with respect to the boundary line and a second angle with respect to a tangent of a track of the master medium; and
      second lines having a third angle different from the first angle with respect to the boundary line and the same second angle with respect to the tangent.

4. A master medium having a servo pattern to be transferred onto a magnetic recording medium, wherein
   the servo pattern is formed with
      a first bit including a pair of a first sub-bit and a second sub-bit sequentially arranged; and
      a second bit including a pair of a third sub-bit and a fourth sub-bit sequentially arranged,
   each of the first sub-bit, the second sub-bit, the third sub-bit, and the fourth sub-bit is a magnetic unit having a polarity,
   the first sub-bit and the fourth sub-bit have a first polarity,
   the second sub-bit and the third sub-bit have a second polarity that is different from the first polarity, and when the first bit and the second bit on adjacent tracks of the magnetic recording medium have a neighboring pattern corner in which the first sub-bit and the fourth sub-bit are arranged to make a diagonal contact or the second sub-bit and the third sub-bit are arranged to make a diagonal contact, either one of the first bit and the second bit is replaced with a pair of the first sub-bits sequentially arranged or a pair of the second sub-bits sequentially arranged.

5. A magnetic recording medium onto which a servo pattern of a master medium is transferred, wherein
the servo pattern is formed with
a first bit including a pair of first sub-bits sequentially arranged; and
a second bit including a pair of a first sub-bit and a second sub-bit sequentially arranged,
each of the first sub-bit and the second sub-bit is a magnetic unit having a polarity,
the first sub-bit and the second sub-bit have different polarities, and
when the first bit is arranged in succession, at least one of continuous first bits is replaced with the second bit.

6. The magnetic recording medium according to claim 5, wherein
when the second bit is arranged with a shift of one sub-bit along a borderline of adjacent tracks of the magnetic recording medium, one of adjacent second bits is replaced with the first bit or a pair of the second sub-bits sequentially arranged.

7. A magnetic recording medium onto which a servo pattern of a master medium is transferred, wherein
the servo pattern has a plurality of oblique lines oppositely arranged across a boundary line, and
the plurality of oblique lines include:
first lines having a first angle with respect to the boundary line and a second angle with respect to a tangent of a track of the master medium; and
second lines having a third angle different from the first angle with respect to the boundary line and the same second angle with respect to the tangent.

8. A magnetic recording medium onto which a servo pattern of a master medium is transferred, wherein
the servo pattern is formed with
a first bit including a pair of a first sub-bit and a second sub-bit sequentially arranged; and
a second bit including a pair of a third sub-bit and a fourth sub-bit sequentially arranged,
each of the first sub-bit, the second sub-bit, the third sub-bit, and the fourth sub-bit is a magnetic unit having a polarity,
the first sub-bit and the fourth sub-bit have a first polarity,
the second sub-bit and the third sub-bit have a second polarity that is different from the first polarity, and
when the first bit and the second bit on adjacent tracks of the magnetic recording medium have a neighboring pattern corner in which the first sub-bit and the fourth sub-bit are arranged to make a diagonal contact or the second sub-bit and the third sub-bit are arranged to make a diagonal contact, either one of the first bit and the second bit is replaced with a pair of the first sub-bits sequentially arranged or a pair of the second sub-bits sequentially arranged.

* * * * *